United States Patent
Cundill

[11] Patent Number: 5,725,244
[45] Date of Patent: Mar. 10, 1998

[54] AIRBAG VENTING MECHANISM

[75] Inventor: David James Cundill, Leicester, England

[73] Assignee: Breed Automotive Technology, Inc., Lakeland, Fla.

[21] Appl. No.: 677,149

[22] Filed: Jul. 9, 1996

[51] Int. Cl.⁶ .................................................. B60R 21/30
[52] U.S. Cl. .................................................. 280/739
[58] Field of Search .................................. 280/739, 729

[56] References Cited

U.S. PATENT DOCUMENTS

| | | | |
|---|---|---|---|
| 3,451,693 | 6/1969 | Carey | 280/739 |
| 3,511,519 | 5/1970 | Martin | 280/739 |
| 3,527,475 | 9/1970 | Carey et al. | 280/739 |
| 3,733,091 | 5/1973 | Fleck et al. | 280/739 |
| 3,762,741 | 10/1973 | Fleck et al. | 280/739 |
| 3,820,814 | 6/1974 | Allgaier et al. | 280/739 |
| 3,831,972 | 8/1974 | Allgaier et al. | 280/739 |
| 3,879,057 | 4/1975 | Kawashima et al. | 280/739 |
| 3,887,213 | 6/1975 | Goetz | 280/739 |
| 3,892,425 | 7/1975 | Sakairi et al. | 280/739 |
| 3,937,488 | 2/1976 | Wilson et al. | 280/739 |
| 4,097,065 | 6/1978 | Okada et al. | 280/739 |
| 4,360,223 | 11/1982 | Kirchoff | 280/729 |
| 4,805,930 | 2/1989 | Takada | 280/739 |
| 5,007,662 | 4/1991 | Abramcyk et al. | 280/739 |
| 5,016,913 | 5/1991 | Nakajima et al. | 280/738 |
| 5,056,815 | 10/1991 | Geisreiter | 280/736 |
| 5,073,418 | 12/1991 | Thornton et al. | 428/34.9 |
| 5,131,434 | 7/1992 | Krummheuer et al. | 139/35 |
| 5,178,408 | 1/1993 | Barrenscheen et al. | 280/728 |
| 5,186,488 | 2/1993 | Takano | 280/728 |
| 5,219,179 | 6/1993 | Eyrainer et al. | 280/739 |
| 5,246,250 | 9/1993 | Wolanie et al. | 280/739 |
| 5,310,215 | 5/1994 | Wallner | 280/739 |
| 5,333,903 | 8/1994 | Eyrainer et al. | 280/743 |
| 5,370,925 | 12/1994 | Koscki | 428/225 |
| 5,405,166 | 4/1995 | Rogerson | 280/739 |
| 5,478,111 | 12/1995 | Marchant et al. | 280/739 |
| 5,492,363 | 2/1996 | Hartmeyer et al. | 280/739 |
| 5,496,063 | 3/1996 | Conlee et al. | 280/739 |
| 5,501,488 | 3/1996 | Saderholm et al. | 280/739 |
| 5,518,269 | 5/1996 | Storey et al. | 280/739 |
| 5,533,753 | 7/1996 | Abraham | 280/739 |
| 5,536,038 | 7/1996 | Bollaert et al. | 280/730.2 |
| 5,538,279 | 7/1996 | Link et al. | 280/738 |
| 5,603,526 | 2/1997 | Buchanan | 280/739 |
| 5,634,659 | 6/1997 | Abraham | 280/739 |

FOREIGN PATENT DOCUMENTS

| | | |
|---|---|---|
| 0529371 | 3/1993 | European Pat. Off. . |
| 0536677 | 4/1993 | European Pat. Off. . |
| 0671247 | 6/1995 | European Pat. Off. . |
| 0700808 | 3/1996 | European Pat. Off. . |
| 06286569 | 10/1994 | Japan . |
| 06286570 | 10/1994 | Japan . |
| 9009908 | 9/1990 | WIPO . |

*Primary Examiner*—Kenneth R. Rice
*Attorney, Agent, or Firm*—Lonnie Drayer

[57] ABSTRACT

An airbag for use in a vehicle occupant protection system has a venting mechanism which allows inflation gas to vent from an inflation chamber through an expandable venting member. The expandable venting member has an inner surface defining an extension of the inflation chamber. The venting member is formed of a gas permeable material and is expandable from a first compressed configuration to a second expanded configuration in response to the inflation pressure in the inflation chamber. While in the compressed configuration the venting member is retained by a retaining member that is not permeable to the inflation gas and has a frangible portion. When the inflation pressure in the airbag reaches a preselected level the frangible portion of the retaining member breaks and the venting member is expanded through the broken portion of the retaining member by the inflation gas. In the expanded configuration the venting member allows the inflation gas to vent to the atmosphere.

17 Claims, 6 Drawing Sheets

5,725,244

AIRBAG VENTING MECHANISM

The present invention relates to methods and apparatuses for venting inflation gas from the interior of an airbag, and more specifically to methods and apparatuses for venting the inflation gas through an expandable, gas permeable venting member.

BACKGROUND OF THE INVENTION

Many motor vehicles are equipped with vehicle occupant protection systems, which include airbags, to protect a vehicle occupant from injury in the event of a crash. Generally, the airbag is stored in a deflated condition within the steering wheel or a component of the vehicle interior. When the vehicle undergoes rapid deceleration, as occurs during a head-on collision, the airbag rapidly inflates due to the introduction of an inflation gas into the airbag interior. It is usual to provide excess inflation gas to the airbag interior to increase the speed of airbag deployment. The excess inflation gas must be vented in order to enhance the cushioning effect of the airbag upon an occupant and to prevent failure of the airbag when impacted by the forward movement of the occupant.

DESCRIPTION OF THE PRIOR ART

U.S. Pat. No. 3,733,091 teaches an inflatable vehicle occupant restraint which allows only very limited venting of inflation gas from the inflation chamber through what is characterized as approaching a one-way valve for the passage of gas into the inflation chamber.

U.S. Pat. No. 3,762,741 teaches the use of rupturable diaphragm or membrane to provide a "conventional blowout patch" for pressure relief of an inflatable occupant restraint device. However; the actual structure of the rupturable diaphragm or membrane is not disclosed or suggested in U.S. Pat. No. 3,762,741.

U.S. Pat. No. 3,879,057 teaches an inflatable vehicle occupant restraint having an exhaust hole which is normally closed by a blocking member which is connected to a restraining member located inside the airbag, the restraining member being responsive to a force exerted on the airbag by a vehicle occupant to open and close the exhaust hole.

U.S. Pat. No. 3,820,814 teaches the use of a "discharge valve" which controls the effective area of a discharge aperture as a function of the gas pressure inside of an airbag.

U.S. Pat. No. 3,887,213 teaches an inflatable vehicle occupant restraint having a plurality of "blow-off patches" provided on the end wall thereof for preventing rebound upon contact with a vehicle occupant. Upon contact of the inflated member with the vehicle occupant the "vent or patches" retain air in the inflated member until a predetermined level of inflation pressure is obtained, at which pressure level the "patches or vents" open or pop off, to permit immediate escape of air from the inflated member. The particular construction of the vents or patches "will be a matter of choice to those skilled in the art." No structure for the "vents or patches" is disclosed or suggested in this publication except in the drawings, where they appear to be nothing more than flaps.

U.S. Pat. No. 4,097,065 teaches an airbag having a gas permeable patch which at all times allows inflation gas to escape from the airbag, but has a slackening portion to prevent the gas permeable patch from being torn or separated from the airbag material as the inflation pressure increases.

U.S. Pat. No. 4,360,223 teaches a check valve which is used with an inflatable vehicle occupant restraint which has more than one inflation chamber to control pressure differentials between the chambers. This check valve has mating flaps which overly an opening and allow one-way passage of gas therethrough.

U.S. Pat. No. 4,805,930 teaches an airbag structure wherein stitched thread seams between fabric elements extends in response to inflation pressure causing the film coating of the airbag material to rupture along the sem and allow gas to escape and maintain a substantially constant overall maximum inflation pressure.

U.S. Pat. No. 5,016,913 teaches the use of a heat-shrinking material to overly an exhaust opening in an airbag. The heat-shrink material has a hole therein which grows larger when the material shrinks due to the heat of the inflation gas filling the airbag.

U.S. Pat. No. 5,186,488 teaches an airbag having a low strength portion of a seam in the airbag material. A frame shaped reinforcement patch is attached on the inside of the airbag in such a manner as to expose part of the low strength seam, thereby defining a part of the seam of preselected size which will fail when the inflation pressure exceeds a selected level.

U.S. Pat. No. 5,310,215 teaches an airbag having a venting opening with a panel overlying the opening and secured, preferably with stitches, to the airbag material. When gas is vented from the inflation chamber through the venting opening the panel restricts flow of the vented gas away from the vehicle occupant.

U.S. Pat. No. 5,492,363 teaches an airbag with an exhaust valve having inner and outer membranes with a pucker formed therebetween and a flow passage from the inflation chamber to the pucker for expulsion of gas through an outer membrane aperture. The inner membrane is extensible in response to impact of the vehicle occupant withe the airbag which exceeds a threshold value so that the inner and outer membranes are brought together in nested engagement so as to dissipate the pucker.

U.S. Pat. No. 5,518,269 discloses an airbag having a dynamic burn vent where inflation gas can be vented.

EP 0 670 247 A1 teaches an inflatable airbag having an opening therein for venting inflation gas. A panel lies on an outer surface of the airbag and overlies at least a part of the opening. The panel is formed of elastic material so that a portion of the panel may be stretched away from the opening to allow passage of inflation gas therethrough.

JA 06286570 A teaches the use of sheet-like elastic members of rubber or the like overlying the ventilation openings in an airbag, the elastic members having exhaust holes therein which are stretched to larger sizes as the inflation pressure in the airbag increases.

JA 06286569 teaches the use of slender exhaust holes, similar to slits, in the airbag with an elastic member, for example of rubber, extending transversely across the exhaust hole and attached to the airbag material. In the early stages of inflating the airbag the area of the exhaust hole opening is restricted by the elastic member, and the airbag is rapidly expanded in size, but when the inflation pressure reaches a predetermined value the elastic members are stretched and the exhaust holes open wider to allow increased venting of the inflation gas.

SUMMARY OF THE INVENTION

In accordance with the practice of the present invention, there is provided an airbag having a ventilation mechanism comprising a gas permeable member for venting inflation gas from the airbag. More particularly, in accordance with the present invention the gas permeable member is expandable in order to minimize a ventilation opening in the airbag while providing sufficient ventilation of inflation gas.

According to one aspect of the present invention, there is provided an inflatable airbag comprising:

airbag material having an outer surface and an inner surface, said inner surface defining an inflation chamber into which inflation gas is directed to inflate the airbag, said airbag material having a ventilation opening therein for venting inflation gas from the inflation chamber, said ventilation opening having a peripheral edge;

a venting member secured to said airbag material in the region of the peripheral edge of said ventilation opening, said venting member comprising a gas permeable material having an outer surface and an inner surface, said inner surface defining an extension of the inflation chamber, said venting member being expandable from a first compressed configuration inside the inflation chamber to a second configuration which extends outside the inflation chamber; and, retaining means for retaining said venting member in said first configuration, the retaining member having a frangible region which is located at least partially in juxtaposition with the ventilation opening in the airbag material and the venting member, the frangible region of the retaining member being breakable when the inflation pressure in the airbag reaches a preselected level and the venting member being expandable in response to the inflation pressure in said inflation chamber to said second configuration extending through the broken portion of the retaining member and beyond the outer surface of the airbag material.

According to another aspect of the invention, there is provided an airbag ventilation mechanism in an airbag formed of airbag material having an outer surface and an inner surface, said inner surface defining an inflation chamber into which inflation gas is directed to inflate said airbag, said airbag material having a ventilation opening therein, said mechanism comprising:

a venting member comprising a gas permeable material having an outer surface and an inner surface, said inner surface defining an extension of the inflation chamber, said venting member being expandable from a first compressed configuration to a second expanded configuration in response to the inflation pressure in said inflation chamber;

securing means for fixedly securing said venting member to said airbag material near a peripheral edge of said ventilation opening; and, retaining means for retaining said venting member in said first configuration, the retaining member having a frangible region which is located at least partially in juxtaposition with the ventilation opening in the airbag material and the venting member, the frangible region of the retaining member being breakable when the inflation pressure in the airbag reaches a preselected level and the venting member being expandable in response to the inflation pressure in said inflation chamber to said second configuration extending through the broken portion of the retaining member and beyond the outer surface of the airbag material.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DETAILED DESCRIPTION OF THE INVENTION

Figure 1:
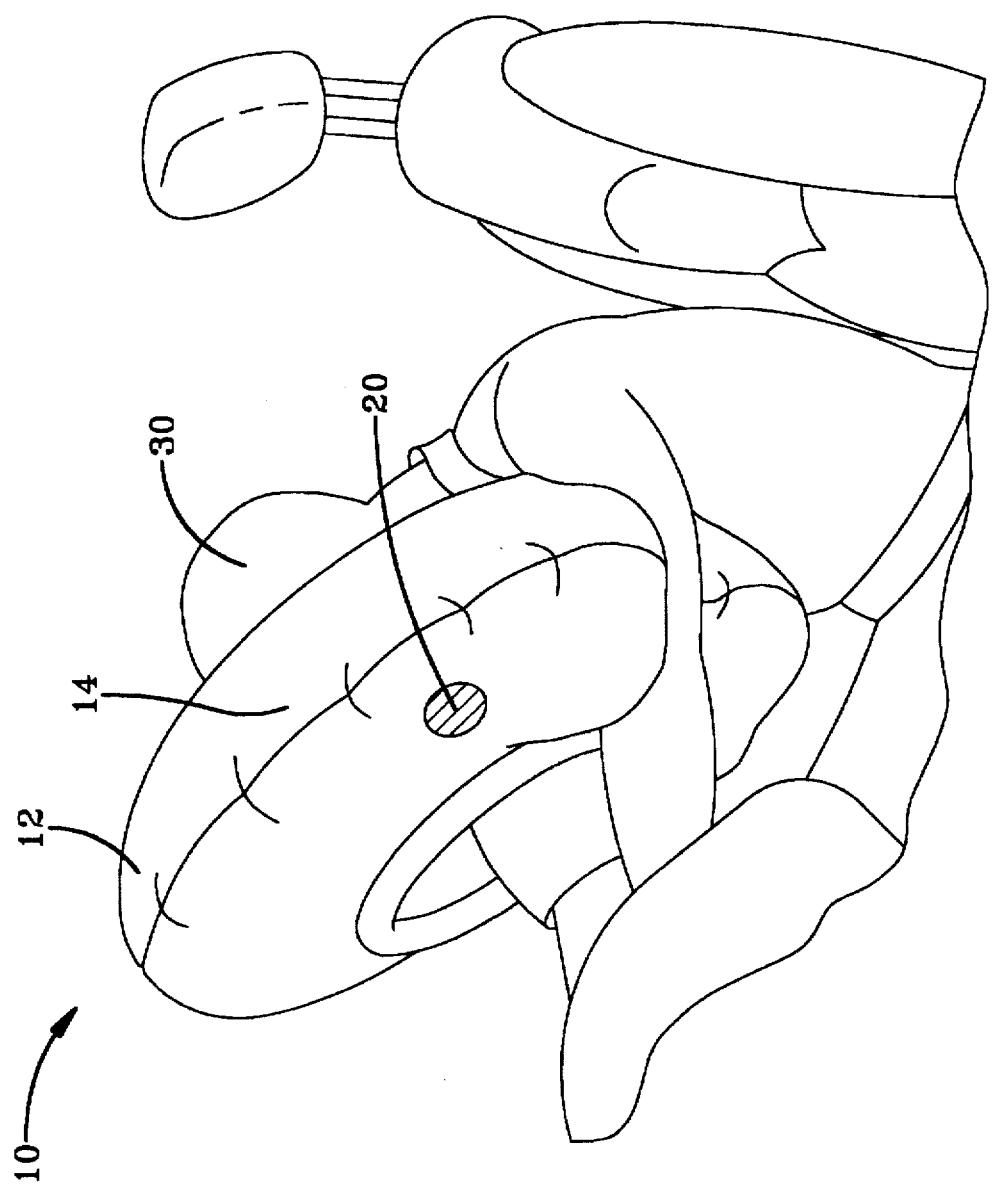
FIG. 1 is a pictorial view of an inflatable airbag of the present invention which is a component of a vehicle occupant protection system.

Referring now to the drawings wherein the showings are for purposes of illustrating a preferred embodiment of the invention only and not for purposes of limiting the same, FIG. 1 shows an airbag 10 of the present invention in an inflated condition. The airbag is a component of a vehicle occupant protection system. The airbag is made of a suitable airbag material 12. The airbag 10 comprises an inflation chamber 14 which is capable of receiving inflation gas upon deployment of the vehicle occupant protection system during a vehicle crash. The airbag material has a ventilation opening 20 therein for venting inflation gas to provide a compliant airbag surface upon impact by a vehicle occupant 30.

As used herein and in the claims the term "airbag material" is understood to mean any suitable coated or uncoated woven fabric as well as nonwoven films that may be used for an airbag.

As used herein and in the claims terms such as "inner", "inner surface" and "inwardly" are understood to be used to refer to surfaces or directions with respect to their proximity to the inflation chamber which exists when an airbag is inflated with the inflation chamber on the inside of the airbag material. Furthermore, as used herein and in the claims terms such as "outer" , "outer surface" and "outwardly" are understood to be used to refer to surfaces or directions with respect to their opposition to the inflation chamber which exists when an airbag is inflated with the inflation chamber on the inside of the airbag material.

Generally speaking, the rate at which inflation gas is vented from the airbag is dependent upon the area of a ventilation opening in an airbag. Covering the ventilation opening with a patch of gas permeable fabric having basically the same surface area as the ventilation opening inhibits the venting of gas as compared to an uncovered ventilation opening. Therefore, in order to achieve the same venting rate as an uncovered ventilation opening, the effective surface area of the gas permeable fabric must be increased. The necessary ventilation rate can be achieved by enlarging the covered ventilation opening or increasing the number of openings. However, increasing the size and/or number of ventilation openings may compromise the structure of the airbag. Also, a larger ventilation opening may have its effective venting surface obstructed by vehicle structure such as the steering wheel or instrument panel. The present invention offers the advantage of having an increased effective venting surface area without enlarging the ventilation opening. Another advantage of the present invention is the provision of a reinforcing member to limit deformation of the ventilation opening and to prevent the airbag material from tearing. Another advantage of the present invention is the provision of a venting mechanism which is readily adaptable to current airbag systems.

Figure 2:
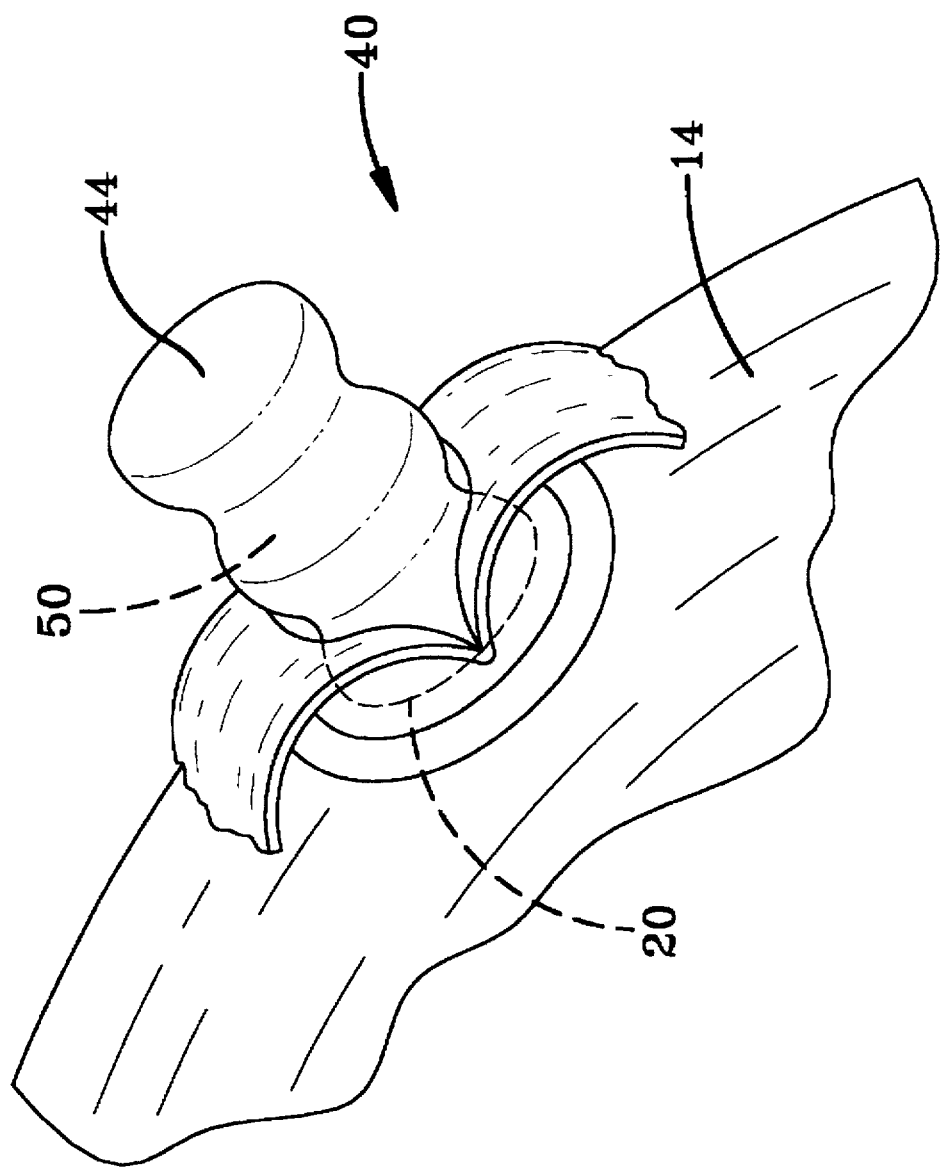
FIG. 2 is a perspective view of a venting mechanism according to the present invention wherein the venting member is in an expanded configuration.

Referring to FIG. 2, there is shown a perspective view of a venting mechanism 40 according to a preferred embodiment of the present invention wherein the venting member 20 is in an expanded configuration. The venting mechanism 40 includes a venting member 44 which is formed of a gas permeable material. When expanded by the inflation gas, the gas permeable material of the venting member 44 forms an extension 50 of the inflation chamber 14. During the deployment of the airbag 10, inflation gas (not shown) is directed into the inflation chamber 14. The inflation gas passes into the extension 50 of the inflation chamber formed by the gas permeable material of the venting member 44 from which the inflation gas is vented to the atmosphere. The venting member may be formed of any suitable gas permeable material such as KEVLAR©. If an airbag will be inflated using a pyrotechnic device, the venting member should be formed of a material that is heat and flame resistant.

The venting member 44, in its expanded configuration, provides an effective venting surface area which is greater than the cross-sectional area of the ventilation opening 20. For example, a ventilation opening having a 20 mm diameter covered by a gas permeable material has an effective venting surface area of about 314 mm². The effective venting surface area of a venting member 44, employed with a 20 mm diameter venting opening, may have an effective venting surface of about 942 mm² in its expanded configuration if the venting member extends outwardly from the airbag material for a distance of about 10 mm and both the sidewall and end of the venting member comprise a gas permeable material. Thus, the effective venting surface is increased in this case by a factor of 3 (942 mm2/314 mm2=3). As shown in FIG. 2, the venting member 44 is preferably cylindrically shaped when in its expanded configuration. Of course the dimensions and number of venting openings and venting members employed with an inflatable member, such as an airbag, will vary from application to application in accordance with good engineering practice.

Figure 3:
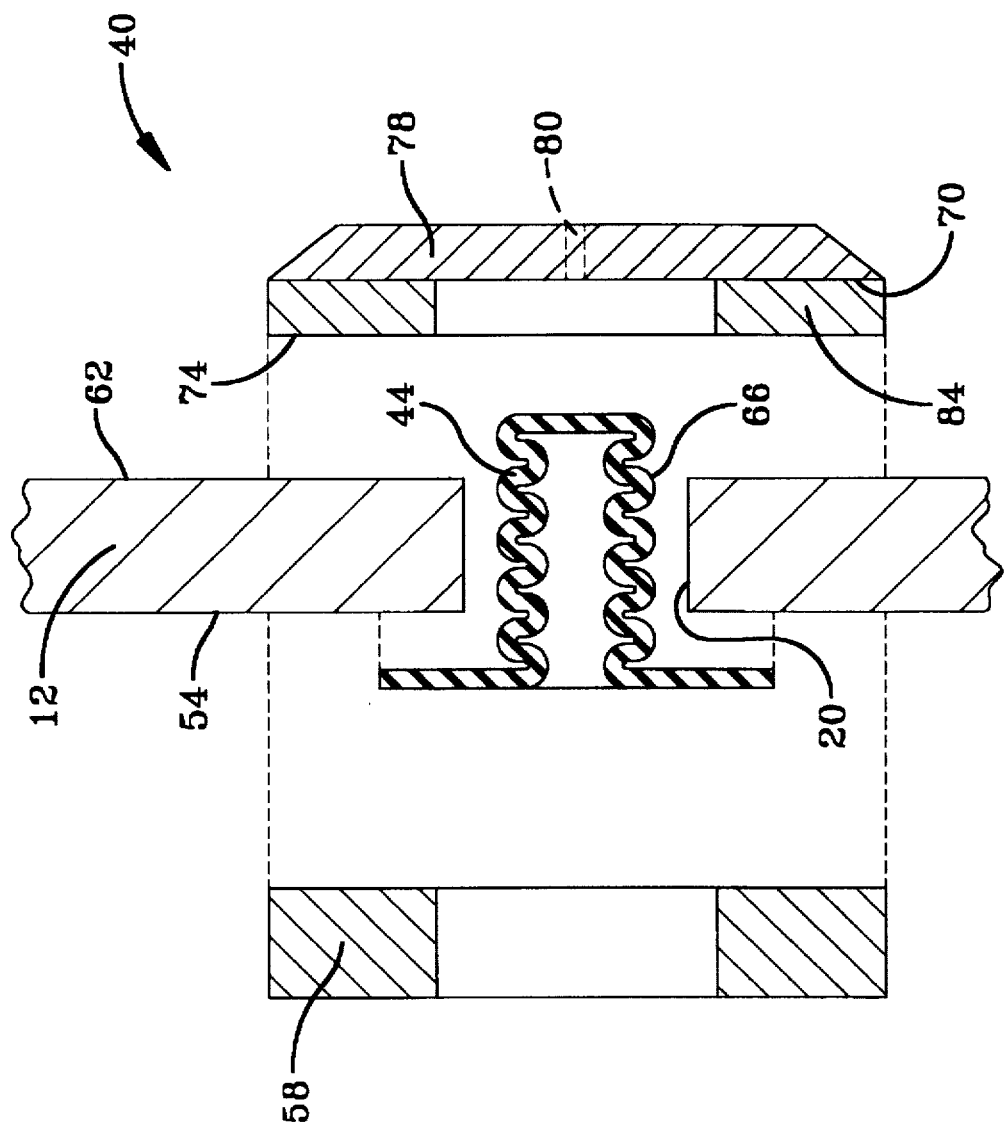
FIG. 3 is an exploded, side, cross-sectional view of one embodiment of a venting mechanism according to the present invention.
Figure 4:
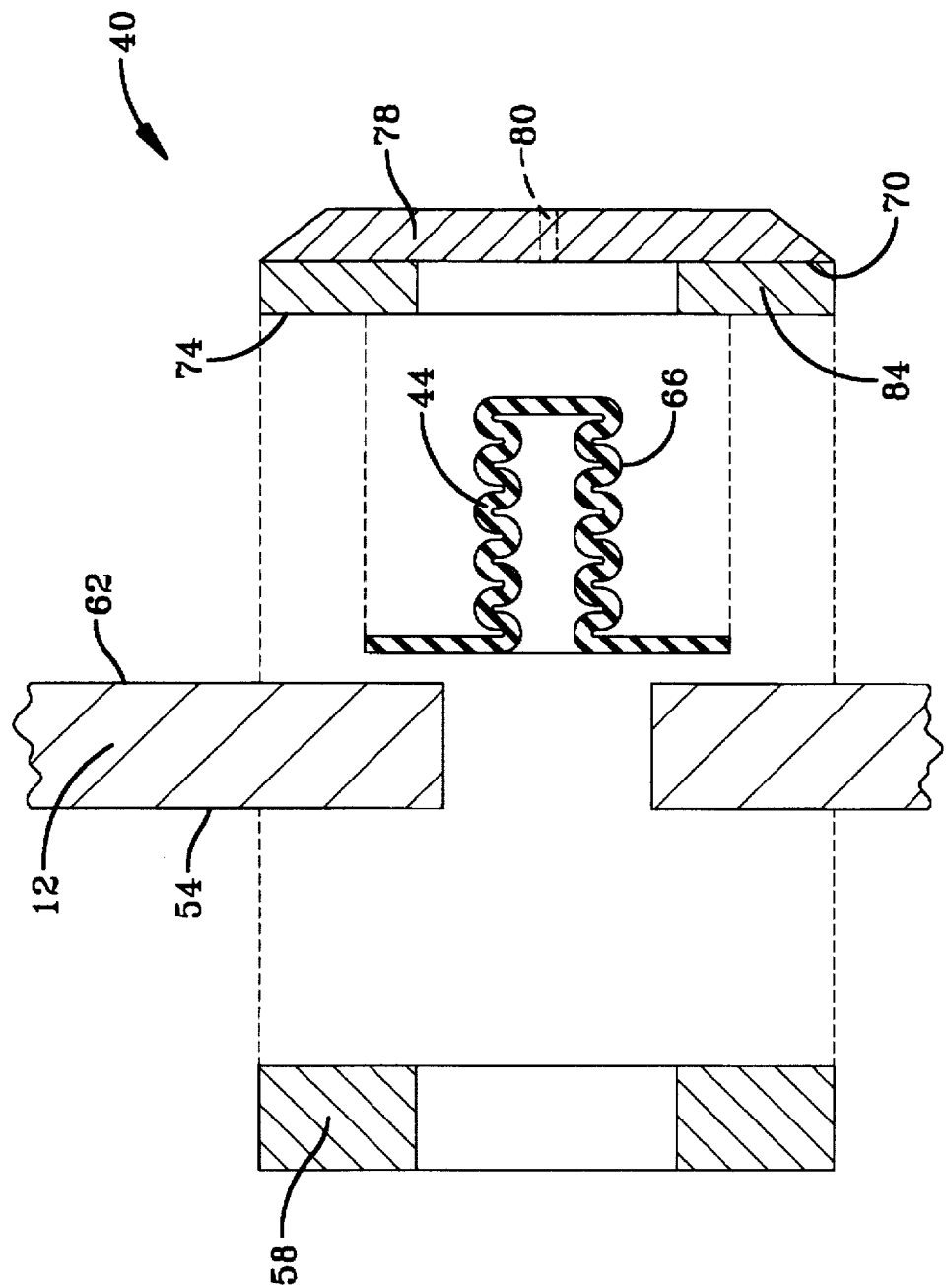
FIG. 4 is an exploded, side, cross-sectional view of another embodiment a venting mechanism according to the present invention.

With reference to FIGS. 3 and 4, exploded side cross-sectional views of two embodiments of the venting mechanism 40 are shown. In the embodiment shown in FIG. 3, the venting member 44 is secured to the inner surface 54 of the airbag material 12. The venting member may be attached to the airbag material by any suitable means including, but not limited to, sewing, an adhesive, insert molding, heat staking or any suitable welding technique such as ultrasonic welding. A reinforcing member 58 helps secure the venting member 44 in place while providing reinforcement to the airbag material 12 around the ventilation opening 20. The reinforcing member 58 may be formed of any suitable thermoplastic material or any suitable non-elastic, non-woven fabric which is stitched or otherwise bonded to the gas permeable fabric of the venting member 44. In one embodiment, the reinforcing member 58 is a plastic ring which can be heat sealed or adhesively bonded to both the venting member 44 and the airbag material 12. It is understood that the use of a reinforcing member on the inner side of the airbag material is optional and dependent upon the required rigidity of the structure in the periphery of the ventilation opening. For instance, if the airbag material and the gas permeable material of the venting mechanism are very light weight, the use of a reinforcing member may be necessary, while in other instances the rigidity imparted by the reinforcing member may not be needed.

In the embodiment shown in FIG. 4, the venting member 44 is secured to the outer surface 62 of airbag material 12. In this embodiment, if a reinforcing member 58 is needed it may be stitched or otherwise bonded to the inner surface 54 of the airbag material 12.

In both FIGS. 3 and 4, the venting member 44 is shown in a compressed configuration. In the preferred embodiment, the compressed configuration includes folds 66 in the gas permeable material. The folds are configured similarly to an accordion or bellows. The cross-sectional shape of the venting member may be circular, oval, or any other desired shape.

The venting mechanism 40 further comprises a retaining means for selectively retaining venting member 44 in the compressed configuration. In a preferred embodiment, the retaining means comprises retaining member 70 which is secured to the outer surface 62 of the airbag material in an overlap region 74. The retaining means has a frangible region 80 which is located at lease partially in juxtaposition with the ventilation opening in the airbag material and the venting member. The frangible region of the retaining member is designed to break when the inflation pressure in the airbag reaches a preselected level. The venting member expands in response to the inflation pressure in said inflation chamber to a configuration extending through the broken portion of the retaining member and beyond the outer surface of the airbag material.

The retaining member 70 may comprise, for example, a fabric patch 78 having a frangible region 80 therein which is breakable in response to the inflation pressure inside the airbag and/or the expansion of venting member 44. Alternatively, as shown in FIGS. 3 and 4, the retaining member 70 may comprise a plastic ring 84 forming a frame to which a frangible fabric patch 78 is affixed, the plastic ring 84 may be heat sealed, adhesively bonded, or thermoplastically molded to the airbag material 12. Alternatively, the frangible fabric patch may be replaced by a plastic member having a frangible region which is located at least partially in juxtaposition with the ventilation opening in the airbag material and the venting member. The plastic retaining member may be heat sealed, adhesively bonded, or thermoplastically molded to the airbag material.

Figure 5:
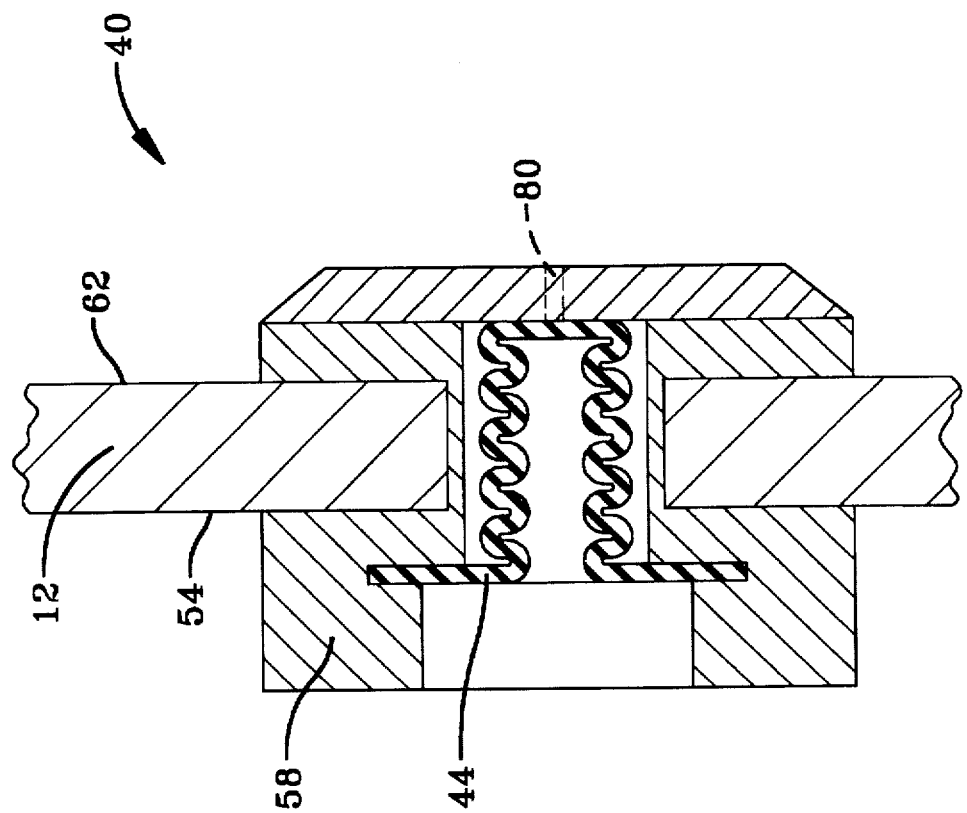
FIG. 5 is a side, cross-sectional view of yet another embodiment of a venting mechanism according to the present invention; and, FIG. 6 is a side, cross-sectional view of the embodiment shown in FIG. 5 showing the expansion action of the venting member.
Figure 6:
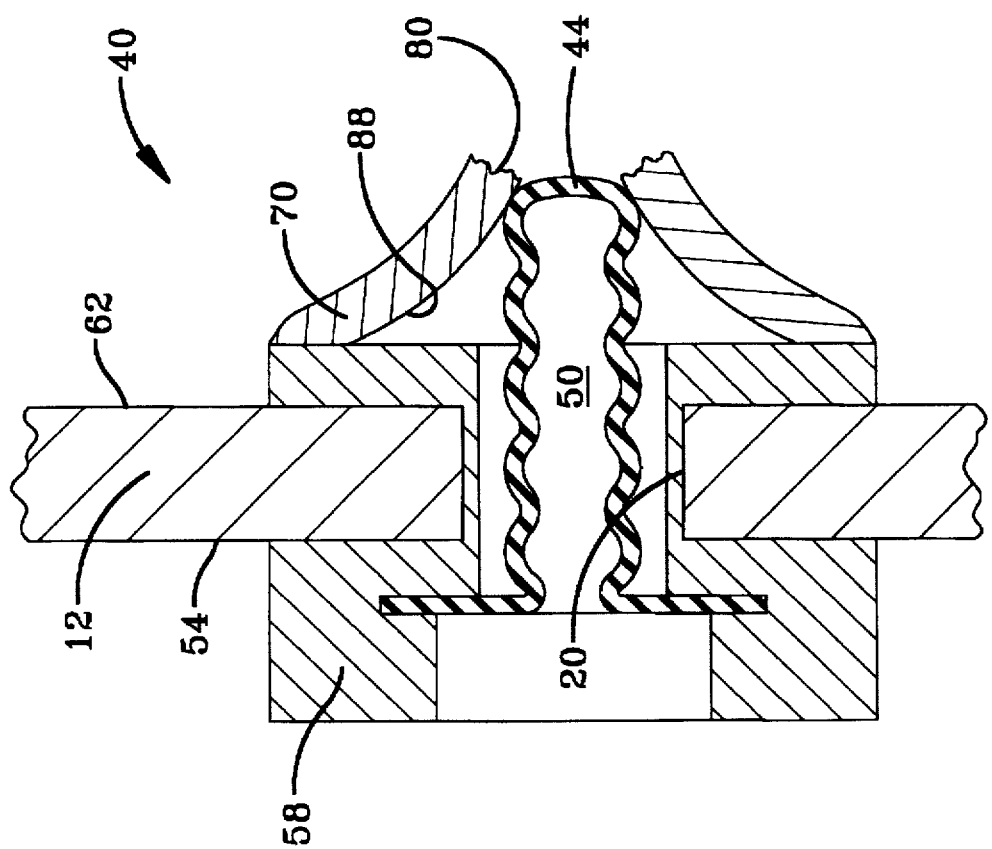

With reference to FIGS. 5 and 6, another alternative embodiment of a venting mechanism 40 in accordance with the present invention is shown. In this embodiment, the retaining member 58 also helps to secure the venting member 44 to the airbag material. The retaining member may again be a plastic ring which is bonded to the airbag fabric by any suitable means such as for example, insert molding, adhesive bonding, or heat sealing.

An inflatable airbag is formed of airbag material having an outer surface and an inner surface. The inner surface of the airbag material defines an inflation chamber into which inflation gas is directed to inflate the airbag. The airbag material has a ventilation opening therein for venting inflation gas from the inflation chamber. A venting member is secured to the airbag material in the region of a peripheral edge of the ventilation opening. The venting member comprises a gas permeable material which has an outer surface and an inner surface with the inner surface defining an extension of the inflation chamber. The venting member is expandable from a first compressed configuration inside the inflation chamber to a second configuration which extends outside the inflation chamber. A retaining means retains the venting member in said first configuration. The retaining member has a frangible region which is located at least partially in juxtaposition with the ventilation opening in the airbag material and the venting member. The frangible region of the retaining member is breakable when the inflation pressure in the airbag reaches a preselected level and the venting member is expandable in response to the inflation pressure into said second configuration extending through the broken portion of the retaining member and beyond the outer surface of the airbag material.

With reference to FIGS. 5 and 6, the frangible region 80 of the retaining member is located at least partially in juxtaposition with the ventilation opening 20 in the airbag material 12. Put another way, at least part of the frangible region of the retaining member is located side by side with, and overlying, the ventilation opening. Preferably the retaining member comprises a material which has a low permeability for the gas used for inflating the airbag. Put another way, the retaining member also functions as a sealing member for sealing the ventilation opening until the frangible region of the retaining member is broken. The frangible region of the retaining member remains intact as the airbag is inflating until the inflation pressure reaches a predetermined maximum level. The frangible region of the retaining member breaks open when the inflation pressure reaches or exceeds the predetermined level, which allows the venting member to expand and extend through the frangible region and vent inflation gas to the atmosphere. In an expanded configuration, the venting member has an effective venting surface area which is greater than that which a gas permeable patch covering ventilation opening 20 in the airbag material would have.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

What is claimed is:

1. An inflatable airbag comprising:

airbag material having an outer surface and an inner surface, said inner surface defining an inflation chamber into which inflation gas is directed to inflate the airbag, said airbag material having a ventilation opening therein for venting inflation gas form the inflation chamber, said ventilation opening having a peripheral edge;

a venting member secured to said airbag material in the region of the peripheral edge of said ventilation opening, said venting member comprising a gas permeable material having an outer surface and an inner surface, said inner surface defining an extension of the inflation chamber, said venting member being expandable from a first compressed configuration inside the inflation chamber to a second configuration which extends outside the inflation chamber; and, a retaining member for retaining said venting member in said first configuration, the retaining member having a frangible region which is located at least partially in juxtaposition with the ventilation opening in the airbag material and the venting member, the frangible region of the retaining member being breakable when the inflation pressure in the airbag reaches a preselected level and the venting member being expandable in response to the inflation pressure in said inflation chamber to said second configuration extending through the broken portion of the retaining member and beyond the outer surface of the airbag material, the retaining member sealing said ventilation opening until the frangible region is broken.

2. The airbag of claim 1 wherein said first configuration of said venting member comprises a plurality of folds in said gas permeable material.

3. The airbag of claim 1 further comprising reinforcing means for reinforcing said airbag material around said peripheral edge, said reinforcing means being affixed to said airbag material.

4. The airbag of claim 3 wherein said reinforcing means comprises a plastic ring molded to said airbag material around the peripheral edge of the ventilation opening.

5. The airbag of claim 1 wherein said retaining member further comprises:

a patch, said patch having said frangible region; and, a ring, said ring forming a frame to which said patch is affixed, said ring being fixedly attached to said airbag material.

6. The airbag of claim 1 wherein said ventilation opening provides an effective venting surface, said venting member increasing said effective venting surface by a factor of at least 3 when in the second configuration.

7. The airbag of claim 1 wherein said venting member when in the second configuration is cylindrically shaped.

8. The airbag of claim 1 wherein said venting member is secured to said outer surface of the airbag material.

9. The airbag of claim 1 wherein said retaining member is secured to said outer surface of the airbag material.

10. An airbag ventilation mechanism in an airbag formed of airbag material having an outer surface and an inner surface, said inner surface defining an inflation chamber into which inflation gas is directed to inflate said airbag, said airbag material having a ventilation opening therein, said mechanism comprising:

a venting member comprising a gas permeable material having an outer surface and an inner surface, said inner surface defining an extension of the inflation chamber, said venting member being expandable from a first compressed configuration to a second expanded configuration in response to the inflation pressure in said inflation chamber;

securing means for fixedly securing said venting member to said airbag material near a peripheral edge of said ventilation opening; and, a retaining member for retaining said venting member in said first configuration, the retaining member having a frangible region which is located at least partially in juxtaposition with the ventilation opening in the airbag material and the venting member, the frangible region of the retaining member being breakable when the inflation pressure in the airbag reaches a preselected level and the venting member being expandable in response to the inflation pressure in said inflation chamber to said second configuration extending through the broken portion of the retaining member and beyond the outer surface of the airbag material, the retaining member sealing said ventilation opening until the frangible region is broken.

11. The airbag ventilation mechanism of claim 10 wherein said ventilation opening provides an effective venting surface, said venting member increasing said effective venting surface by a factor of at least 3 when in the second expanded configuration.

12. The airbag ventilation mechanism of claim 10 wherein said venting member when in said second expanded configuration is cylindrically shaped.

13. The airbag ventilation mechanism of claim 10 wherein said venting member is secured to said outer surface of the airbag material.

14. The airbag ventilation mechanism of claim 10 wherein said retaining member is secured to said outer surface of the airbag material.

15. The airbag ventilation mechanism of claim 10 wherein said retaining member further comprises:
   a patch, said patch having said frangible region; and,
   a ring, said ring forming a frame to which said patch is affixed, said ring being fixedly attached to said airbag material.

16. A method for venting gas from an airbag having a ventilation opening, said method for use with an airbag ventilation mechanism that includes a venting member having a frangible region and a retaining member for retaining said venting member, said method comprising the steps of:
   beginning to inflate the airbag with said gas;
   sealing said ventilation opening until the inflation pressure in the airbag reaches a preselected level;
   breaking said frangible region of said venting member when the inflation pressure in the airbag reaches said preselected level;
   extending said venting member through said frangible region; and,
   venting said gas to the atmosphere through said venting member.

17. The method of claim 16 wherein, after the step of extending said venting member through said frangible region, said method comprises the step of:
   increasing the effective venting surface by a factor of at least 3 without enlarging said ventilation opening.

* * * * *